United States Patent Office 3,558,209
Patented Jan. 26, 1971

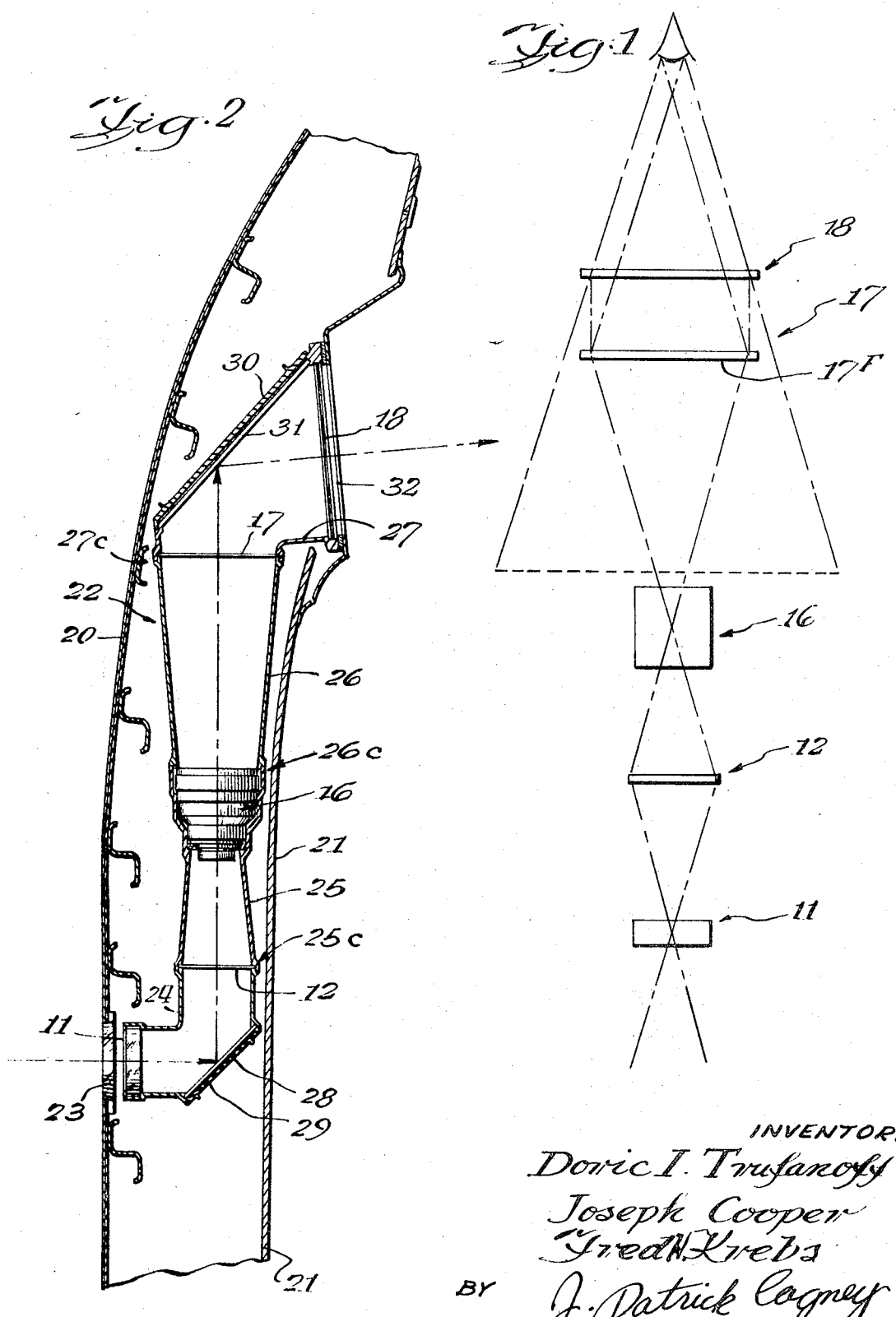

3,558,209
OPTICAL VIEWING SYSTEM FOR AIRCRAFT WINDOW
Doric I. Trufanoff, North Massapequa, Joseph Cooper, Franklin Square, and Fred H. Krebs, Elmont, N.Y., assignors to Kollsman Instrument Corporation, Syosset, N.Y., a corporation of New York
Filed Nov. 13, 1968, Ser. No. 775,329
Int. Cl. G02b 23/08
U.S. Cl. 350—9    2 Claims

ABSTRACT OF THE DISCLOSURE

A periscopic type of optical viewing window arrangement for an SST aircraft is shown wherein all passengers see a virtual image of a real image that is presented on a projection screen. The arrangement utilizes an objective lens associated with a miniature external window and utilizes a Fresnel magnifying lens for presenting the magnified virtual image.

---

This invention relates to an optical viewing window for providing a realistic view of the outside world through a window of minimum size and more particularly is concerned with an optical viewing window arrangement suited for use in an SST wherein the exteriors windows are of unusualy small size and the scene is to be presented for viewing to one or more passengers to provide each passenger a view similar to that now obtained through conventional aircraft windows.

In particular, in the case of an SST it is desirable that the passenger windows be less than 3 inches in diameter in order to minimize thermal radiation and in order to maintain the desired structural strength of the air frame. The conventional size of passenger windows in current aircraft is about 6 inches by 8½ inches and it is desired to give the passengers a realistic view through the 3 inch windows equivalent to that now experienced with conventional windows. In accordance with the present invention, an optical viewing window arrangement utilizing a virtual image viewing system is provided in order to allow a comparable view to all passengers seated in the same row.

An optical viewing window in accordance with the present invention for providing a representation of a real world scene comprises an objective lens for collecting and forming an image of the real world scene, a field lens for intercepting off axis diverging rays from the objective lens and redirecting such off axis diverging rays to the conjugate point of the field lens, relay means having an aperture located at the conjugate point and forming a magnefied image at the conjugate focus of the relay lens and presentation means including a projection screen disposed at the conjugate focus of the relay lens.

In particular in application to an SST where the air frame has a flush mounted miniature exterior window the optical window arrangement incorporates a periscopic housing having object and viewing elbows connected by successive sleeve sections all serving to mount the objective lens, the field lens, the relay lens and the projection screen, with a Fresnel magnifying lens disposed at the free end of the viewing elbow to present a virtual image for simultaneous viewing by all passengers in the corresponding row.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the scpecification in which like numerals are employed to designate like parts throughout the same:

FIG. 1 shows an optical schematic of a simplified embodiment of the present invention; and FIG. 2 is a fragmentary lengthwise sectional view illustrating a periscopic mounting arrangement for an optical viewing window within the side wall structure of an air frame.

DESCRIPTION OF PREFERRED EMBODIMENT

Referring now to FIG. 1 a simplified schematic view is shown therein to represent an optical system capable of use with a window opening of minimum size to provide a capability for viewing of the outside world, for example, to passengers in an aircraft such as an SST. In the simplified system of FIG. 1 the optical arrangement includes an objective lens 11 for collecting and forming an image of a real world scene, a field lens 12 for intercepting the off axis diverging rays from the objective lens 11. The field lens 12 redirects the off axis diverging rays to the conjugate point of the field lens. A relay lens 16 has its aperture located at the conjugate point of the field lens and reimages the field rays incident at such aperture at the conjugate focus of the relay lens. A projection screen 17 is shown positioned at the conjugate focus of the relay lens so that a real image of the real world scene is formed thereat. Finally, a Fresnel magnifying lens 18 is located forwardly of the projection screen 17 to present to an observer a magnified virtual erect image of the real image appearing on the back of the projection screen.

For the arrangement as described wherein a virtual image is projected to the observer a coating is applied on the front face 17F of the projection screen to amplify the screen brightness. Typically, a coating such as is sold under the trademark "Pola-coat," catalog number LSG–2000 of Pola-coat Company, may be utilized.

Where it is desired to present direct viewing of the real image upon the projection screen the coating is applied on the rear face of the screen.

In the preferred embodiment the field lens 12 is also a Fresnel lens of short focal length and of large F number and typically is comprised of a compression molded plastic. It offers the advantage of lightweight and low cost.

A particular embodiment of the optical viewing window arrangement of this invention as applied to passenger viewing windows of an SST is illustrated in FIG. 2 wherein a portion of the side wall structure of the air frame is shown as including the outer skin 20 of the aircraft and a set of removable interior panels 21 spaced therefrom and defining a wall clearance space which may typically be about 6 inches across. A periscopic housing structure designated generally at 22 is shown mounted within the wall space to house the optical elements for presenting a view to the passengers of the real world scene.

In the case of an SST it is important to minimize the required window opening in the outer skin 20 in order to reduce thermal radiation effects and in order to increase the structural strength of the air frame. Accordingly, the passenger viewing windows in the outer skin are here represented as comprising a fused quartz element 23 seated flush with the outer skin and having a maximum clear aperture of two and one-quarter (2¼) inches. The viewing unit illustrated herein is intended to provide an unobstructed view to the passengers and to give them the feeling of looking directly out through a conventional window in an aircraft.

In the particular structural arrangement shown herein, the periscopic housing includes an elbow 24 at the object end, an intermediate sleeve 25 having a lap joint connection 25C at the inner end of the elbow, an enlarged extension sleeve 26 having a lap joint connection 26C to the other end of the intermediate sleeve and a viewing elbow 27 having a lap joint connection 27C to the enlarged sleeve. The objective lens 11 is shown mounted within the outer end of the object elbow 24 and the field lens 12 is shown mounted in the lap joint 25C between the object elbow 24 and the intermediate sleeve 25. The end of the elbow is provided with a cold (dichroic type) deviating mirror 28 serving to reflect all the useful visible light from the objective lens 11 to the primary focal plane at the field lens 12. A fin type heat sink structure 29 serves as the bend wall for mounting the deviating mirror 28 and is arranged to transmit the undesired heat and infrared radiation.

The opposite end of the intermediate sleeve 25 has a flared wall configuration serving as a mounting pocket for the relay lens 16 which is used to propagate the light to the back face of a rear projection screen 17 which is shown mounted in the lap joint between the viewing elbow 27 and the extension sleeve 26.

In the arrangement illustrated, a real world image is formed on the back of the rear projection screen 17 at a magnification of 1.8×. The viewing elbow 27 has a bend wall structure 30 of a finned type, as previously described, serving to mount a deviating mirror 31 which inverts the image to proper real world position as necessary where the mirror in the object elbow is used. The second deviating mirror 31 deviates the line of sight by 90–100° and transmits the light through a Fresnel lens type of magnifying window 18 through which the passengers may view the real world scene which is picked up through the exterior window. A protective window 32 is shown mounted across the Fresnel lens magnifying window 18. The apparent dimensions of the scene as viewed by the passenger in the adjacent seat are 6" by 8½", this magnified image being seen as a virtual image in the aspect of the passenger, gives the passenger the feeling of actually looking down a short well and through an oval window of such dimensions. It is important to note that the virtual image viewing system provides comparable viewing capabilities to all passengers seated in the same row so that each feels that one is viewing a realistic picture through a conventional window of an aircraft.

Thus while preferred constructional features of the invention are embodied in the structure illustrated herein, it is to be understood that changes and variations may be made by those skilled in the art without departing from the spirit and scope of the appended claims.

This embodiments of the invention in which an exclusive privilege or property is claimed are defined as follows.

We claim:
1. In a passenger aircraft having outer air frame structure that includes a port opening and window of limited aperture and having interior panel structure spaced from said frame structure and defining a hollow wall space, optical viewing structure for projecting a realistic view of the outside world for viewing from any location along a passenger row within the aircraft, said viewing structure comprising a periscopic housing structure positioned in said hollow wall space and having an objective elbow, an intermediate sleeve, an enlarged extension sleeve and a viewing elbow disposed in successive end to end connected relationship, an objective lens disposed in the free end of said objective elbow adjacent said window of limited aperture to receive incident light entering the limited aperture and form a real image, a deviating mirror disposed in the bend region of said objective elbow, a field lens disposed in the joint region between said objective elbow and said intermediate sleeve to receive the real image, a relay lens disposed in the joint region between said sleeves to project an inverted image of the real image, a rear projection screen mounted in the joint region of said extension sleeve and said viewing elbow to receive the inverted image, a second deviating mirror mounted in the bend region of said viewing elbow and a large magnifying lens mounted at the free end of said viewing elbow in a window-like fashion in said interior panel structure in endwise alignment with said passenger row to form a magnified erect virtual image viewable from along said passenger row, said magnifying lens having an aperture sufficiently larger than said window of limited aperture to provide a view capable of simulating a view of the outside world through a conventional size aircraft window.

2. In a passenger aircraft in accordance with claim 1 wherein said magnifying lens comprises a Fresnel lens.

References Cited
UNITED STATES PATENTS

| | | | |
|---|---|---|---|
| 1,520,002 | 12/1924 | Bedell | 350—9UX |
| 2,589,014 | 3/1952 | McLeod | 350—211X |
| 2,738,753 | 3/1956 | Eubank | 350—9 |
| 2,817,994 | 12/1957 | Ehrenhaft et al. | 350—54X |
| 3,182,576 | 5/1965 | Papke | 350—9X |
| 3,140,883 | 7/1964 | Anthony | 350—211UX |

FOREIGN PATENTS

| | | | |
|---|---|---|---|
| 1,344,385 | 10/1963 | France | 350—9 |

DAVID H. RUBIN, Primary Examiner

U.S. Cl. X.R.

350—45, 52, 54, 211, 302